March 4, 1952     J. W. TETER ET AL     2,588,056
SEPARATION OF PROPENE AND PROPANE BY
EXTRACTIVE DISTILLATION
Filed Sept. 30, 1947
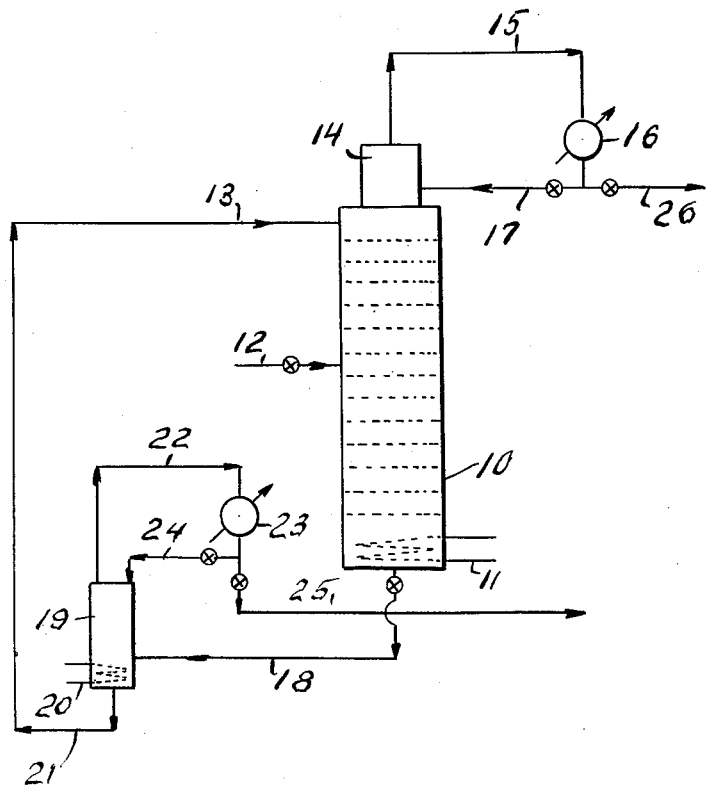
JOHN W. TETER
EDWIN W. SHAND
INVENTORS Patented Mar. 4, 1952

2,588,056

UNITED STATES PATENT OFFICE 2,588,056

SEPARATION OF PROPENE AND PROPANE BY EXTRACTIVE DISTILLATION

John W. Teter, Chicago, and Edwin W. Shand, Homewood, Ill., assignors to Sinclair Refining Company, New York, N. Y., a corporation of Maine Application September 30, 1947, Serial No. 776,941

2 Claims. (Cl. 202—39.5)

This invention relates to the separation of mixtures of hydrocarbon types of narrow boiling range by selective extraction. More particularly, this invention relates to the separation of such mixtures of hydrocarbon components by means of distillation of the hydrocarbon stock in the presence of a relatively less volatile selective solvent comprising an aliphatic nitrile, with removal of a vapor fraction enriched in the hydrocarbon component less soluble in solvent and the removal of a liquid fraction comprising solvent and enriched in the more soluble hydrocarbon component.

Mixtures of hydrocarbon components having a narrow range of boiling points present obvious difficulties in physical separation. Since the composition of the vapor phase and the composition of the liquid phase under conditions of vapor-liquid equilibrium are substantially the same, separation by means of ordinary fractional distillation is impracticable, if indeed it is possible at all. Where the hydrocarbon components, however, possess type differences in structure or degree of saturation, a shift in the relative volatility and hence the vapor composition may be effected by the admixture of a selected mutual solvent forming non-ideal solutions with the hydrocarbon components. This shift in the relative volatility of the hydrocarbon components from a value approximating unity reflects the varying degree of deviation of the system, hydrocarbon-solvent, from the laws of ideal solution. Where the mutual solvent is relatively non-volatile in comparison with the hydrocarbon mixture, the shift or spread in the relative volatility of the hydrocarbon components makes possible a vapor-liquid phase separation of the mixture.

This separation takes the form of a distillation process carried out in the presence of the relatively less volatile solvent, where the hydrocarbon components show a positive deviation from the laws of ideal solution and the vapor fraction recovered is enriched in the component showing less deviation and the liquid fraction or bottoms comprises the relatively non-volatile solvent enriched in the component showing the greater deviation. Such a distillation process may be conducted as a simple batch process or as a continuous fractional process. For practical reasons, the process is ordinarily conducted as a continuous process, governed by well-known design factors.

The crucial problem in the effectiveness of such a process of distillation hinges upon the proper selection of the selective solvent. The choice of solvent is important primarily with regard to its selectivity respecting the hydrocarbon types to be separated. In a continuous process high selectivity of solvent affords greater enrichment per tray and at the same time results in a reduced solvent circulation requirement and lower separation costs. The capacity of the solvent for the hydrocarbon components, that is, the measure of mutual solubility, however, must be balanced against selectivity, for selectivity generally improves with reduced capacity for at least one of the non-solvent components. On the other hand, reduced capacity results in higher solvent circulation requirements and may result in phase difficulties due to the separation of multiple liquid phases. The volatility of the solvent relative to that of the hydrocarbon components is an important factor in solvent selection, for enrichment per tray or stage in the process improves with the spread in volatility between solvent and hydrocarbon components. In addition, the relative non-volatility of the solvent is important in permitting solvent recovery by simple stripping. Separability is likewise favored by the absence of chemical reaction and azeotropic formation with either or both hydrocarbon components. Consequently, the choice of an appropriate solvent or mixture of solvents is complicated by the necessity of balancing a number of interrelated and somewhat antagonistic characteristics, but represents the prime factor in commercial practicability.

We have determined that certain aliphatic nitriles possess in desirable relationship qualities marking their utility as selective solvents in the distillation of closely boiling hydrocarbon types e. g. olefins and paraffins. Useful solvents comprise lower aliphatic saturated and unsaturated nitriles. The lowest nitrile of the series is acetonitrile, which has a boiling point of 81.6° C. Accordingly, it is apparent that these nitriles possess a desirable degree of non-volatility relative to the light hydrocarbons whose mixtures are the subject of commercial separation processes. The useful nitriles are the lower members of the acetonitrile and the acrylonitrile series, and the lower homologues of each series up to at least four carbon atoms in the chain may be considered equivalents. It has been found, however, that acetonitrile itself is particularly advantageous as a selective solvent for the concentration of olefins, in that it displays a degree of selectivity markedly above that of its homologues and out of proportion to any homologous relationship. In the case of the unsaturated nitriles, inhibition against polymer formation may be desirable. Another group of aliphatic nitriles which has been found to be useful for the purposes of this invention comprises the chlorinated lower aliphatic nitriles containing up to four carbon atoms in the chain. These chlorinated homologues may contain one or more chlorine atoms with no apparent relationship existing between the number of chlorine substituents or the symmetrical or non-symmetrical disposition of these substituents within the molecule. Monochloroacetonitrile, however, has been found to possess surprising superiority, particularly marked by a high degree of selectivity with a correlatively low solvent circulation requirement. For example, in the separation of n-butane and n-butene-1, monochloroacetonitrile requires a circulation only 80–86 mol percent as much as with furfural containing 4 weight per cent water, where the feed constitutes 50.6 mol per cent n-butane and 49.4 mol per cent n-butene-1, the tower contains 34 to infinite plates operated at minimum reflux, and the solvent concentration in the liquid existing in the portion of the tower between the solvent entry and feed points is 85 mol per cent.

The nitrile solvents may be used alone or in multi-component mixtures. Indeed, it has been found that the multi-component nitrile solvents possess special advantages in that their degree of selectivity is significantly higher than would be predicted from the selectivities of the individual solvent components. Multi-component mixtures comprising the nitriles and water have also been found to be advantageous. In this respect there is an optimum range of water content in the nitrile-water mixtures with regard to the maximum selectivity developed. For example, the optimum range of selectivity for acetonitrile and water lies in the range of 15 to about 30 per cent water content by weight with a maximum selectivity developed at a water content of about 25 weight per cent.

This invention comprehends a process of selective extraction utilizing a nitrile solvent to shift the relative volatility of the components of a mixture of hydrocarbon types, e. g., olefins and paraffins, so that under an approximation of equilibrium conditions, the vapor-liquid compositions are shifted sufficiently to enable effective separation of hydrocarbon components in the course of a continuous process of phase separation.

A flow diagram for a process utilizing this principle and the solvents of this invention is exemplified in the drawing. The hydrocarbon feed enters a rectification tower 10 through line 12. Solvent is introduced near the top of the tower through line 13 and descends through the tower with the upper part of the tower serving as an absorber section and the lower portion of the tower serving as a stripping section. Heat may be applied to the bottom of the tower as by steam coil 11. The tower 10 contains a number of trays or bubble cap plates or is packed to a height corresponding to a number of theoretical plates calculated as is well-known in the art; e. g. the McCabe-Thiele method, corrected by an empirically determined plate efficiency figure. The vapor composition increases in the hydrocarbon component showing the least deviation from the ideal solution laws; e. g., the paraffin, from plate to plate upward through the tower, and correspondingly the liquid composition on the plates increases; e. g., for olefin, downward through the tower in the hydrocarbon component displaying the greatest deviation from the laws of ideal solution. The vapor products which are removed overhead through line 15 are accordingly enriched in the paraffinic hydrocarbon component. The vapor product is condensed in condenser 16 from which the product is removed by line 26, and from which reflux may be returned to the tower top through line 17. In order to remove entrained solvent, a partial condenser or dephlegmator 14 may be positioned at the top of the tower. The bottoms comprising solvent and the olefinic hydrocarbon component are withdrawn through line 18 and introduced into a stripping drum 19, to which heat is supplied, as through steam coil 20. In the stripping drum, a separation is effected between solvent which is withdrawn through line 21 and returned to the process and hydrocarbon which passes overhead through line 22, through condenser 23 and line 25. Reflux may be returned to the drum through line 24. As has been noted, such design factors as the number of plates in the tower, the reflux ratio and the solvent concentration are determined for the process by methods well-known to the art, and vary with the rate and character of the feed together with the nature of the solvent selected.

We have discovered that the relative solubility in the solvent of the hydrocarbon types to be separated presents a reliable qualitative index of solvent selectivity as regards the process of this invention. Since the solvent is relatively non-volatile under the conditions of approximate vapor-liquid equilibria, the concentration of the vapor phase in the two binary systems, paraffin-solvent and olefin-solvent, may be considered substantially all hydrocarbon. And since the binary system, paraffin-olefin, approaches ideality, the relative solubility of the ternary system, paraffin-olefin-solvent, may be conveniently regarded as the ratio of the mol fractions of olefin and paraffin dissolved by solvent. Accordingly, the ease of separation with various solvents and with various solvents under different conditions of temperature, pressure, and solvent concentration may be conveniently estimated by means of solubility determinations on the binary hydrocarbon-solvent mixtures.

The manner of determining the solubility of hydrocarbons in nitrile solvents will be illustrated in the following examples, and the resulting data for the systems, propane-solvent and propylene-solvent, are set forth in Table I. In Table II comparative data on four carbon-membered hydrocarbon-solvent systems with furfural and monochloroacetonitrile at 100° F. and 38.4 p. s. i. a. are present.

EXAMPLE I

The solubility of propane and propylene at their vapor pressures at room temperature in various solvents is measured. A Jergusen gauge (capacity 200 cc.) is evacuated and filled with the gas by allowing liquid propane or propylene to expand into it at room temperature (80–84° F.). The pressure is read and a measured volume of solvent (25 cc.) is injected into the gauge by applying a pressure of nitrogen in excess of the gas pressure to a column of mercury which backs up the solvent. The gas and solvent are agitated until no further drop in pressure is noted. The volume and pressure are read. Nitrogen pressure is again applied until the pressure comes to and remains constant at the original pressure of the gas. The shrinkage in volume from the original volume is the volume of gas dissolved.

EXAMPLE II

A vapor-liquid equilibrium cell adapted for contacting in either the vapor or liquid phase over a range of pressures from 0 to 1000 p. s. i. a. and a temperature range up to 300° C. was utilized. To check the reproducibility of the results obtained by the method of Example I, the solubility of propane and propylene in the same group of nitrile solvents at 95 p. s. i. a. and 80° F. was measured. The cell consists of a heavy-wall cylindrical carbon steel vessel of approximately 500 ml. internal volume, containing a reciprocating basket-type stirrer operated by an external magnetic system, and a thermowell. A bottom connecting tube leads to a calibrated system for adding or withdrawing known amounts of liquid. A top connecting tube provides a connection to which may be attached a pressure gage or other pressure measuring devices, and a connection where vapor may be admitted or withdrawn. The whole is contained within a thermostatic bath. Provisions are made for admitting vacuum or taking samples at either connection. In operation, the cell is evacuated and the hydrocarbon vapor is admitted through the top connecting tube from a metering vessel maintained at 100±2° F. A measured quantity of solvent; e. g., 25 ml., is admitted through the bottom connecting tube, and the system is agitated until equilibrium is established. The pressure drop is noted, and the system is restored to the original pressure with nitrogen.

Table I

| Solvent | Mol Fraction of Solvent in the Solvent-Propylene phase, percent | Mol Fraction of Solvent in the Solvent-Propane phase, percent | Mol Fraction: Propylene/Propane |
|---|---|---|---|
| Acetonitrile | 80.9 | 85.8 | 1.35 |
| Acetonitrile, 5% H2O | 83.3 | 88.6 | 1.46 |
| Acetonitrile, 10% H2O | 87.3 | 90.9 | 1.39 |
| Acetonitrile, 15% H2O | 89.2 | 93.0 | 1.54 |
| Acetonitrile, 20% H2O | 90.0 | 93.1 | 1.45 |
| Acetonitrile, 25% H2O | 90.7 | 94.3 | 1.63 |
| Acetonitrile, 35% H2O | 92.5 | 94.5 | 1.36 |
| Acetonitrile, 50% H2O | 94.3 | 95.9 | 1.39 |
| Acetonitrile, 75% H2O | 97.7 | 97.0 | 0.77 |
| Water | 98.2 | 97.7 | 0.78 |
| Acetone | 61.4 | 62.5 | 1.03 |
| Acetone, 10% H2O | 74.9 | 77.5 | 1.11 |
| Furfural | 81.7 | 84.6 | 1.19 |
| Furfural, 4% H2O | 84.8 | 87.6 | 1.23 |

Table I—Continued

| Solvent | Mol Fraction of Solvent in the Solvent-Propylene phase, percent | Mol Fraction of Solvent in the Solvent-Propane phase, percent | Mol Fraction: Propylene/Propane |
|---|---|---|---|
| Acrylonitrile | 66.3 | 73.9 | 1.29 |
| Propionitrile | 69.6 | 72.9 | 1.12 |
| Butyronitrile | 62.1 | 68.7 | 1.21 |
| Isobutyronitrile | 59.9 | 61.9 | 1.05 |
| Monochloroacetonitrile | 76.9 | 85.0 | 1.54 |
| Dichloroacetonitrile | 63.9 | 71.4 | 1.26 |
| 2-Chloropropionitrile | 62.4 | 70.5 | 1.27 |
| 3-Chloropropionitrile | 81.9 | 80.9 | 0.948 |
| 2,2-Dichloropropionitrile | 51.9 | 48.3 | 0.930 |
| 2,2,3-Trichloropropionitrile | 57.5 | 57.3 | 0.995 |
| 3-Chlorobutyronitrile | 74.4 | 76.4 | 1.08 |
| 4-Chlorobutyronitrile | 80.3 | 79.8 | 0.975 |
| 2,2-Dichlorobutyronitrile | 51.9 | 50.5 | 0.972 |
| 2,2,3-Trichlorobutyronitrile | 52.7 | 55.3 | 1.06 |
| 2,2,4-Trichlorobutyronitrile | 67.2 | 62.1 | 0.865 |
| 50% Monochloroacetonitrile / 50% Acetonitrile | 79.5 | 87.1 | 1.59 |
| 50% Acrylonitrile / 50% Acetonitrile | 74.4 | 85.1 | 1.72 |
| 47.5% Acetonitrile / 47.5% Acrylonitrile / 5.0% Water | 79.2 | 87.3 | 1.64 |
| 60% Acetonitrile / 30% Acrylonitrile / 10% Water | 83.4 | 90.4 | 1.73 |
| 65% Acetonitrile / 20% Acrylonitrile / 15% Water | 86.2 | 92.4 | 1.82 |

Table II

| Run No. | Duration Hours | Solvent | Gas | Mols Solvent Charged | Mols Gas Dissolved | Mol Fraction Gas Dissolved | Total Pressure p. s. i. a. at 100° F. | Activity Coefficient | Mol Fraction Ratio—X olefins / X butane | Activity Coefficient Ratio—X butane / X olefin |
|---|---|---|---|---|---|---|---|---|---|---|
| 1 | 1.7 | Furfural—4 weight per cent water. | Butadiene | 0.352 | .0896 | 0.203 | 38.3 | 3.14 | 2.10 | 2.53 |
| 2 | 1.5 | do | Butene-1 | 0.352 | .0312 | .0814 | 38.3 | 7.71 | .844 | 1.03 |
| 3 | 2.25 | do | Butene-2 | 0.352 | .0604 | .167 | 38.3 | 4.73 | 1.73 | 1.68 |
| 4 | 1.3 | do | N-Butane | 0.352 | .0376 | .0965 | 38.3 | 7.94 | | |
| 5 | 1.3 | do | do | 0.352 | .0313 | .0817 | 38.3 | 9.38 | | |
| 6 | 1.3 | do | Isobutane | 0.352 | .0154 | .0419 | 38.3 | 13.07 | | |
| 7 | 1.4 | Monochloroacetonitrile. | do | 0.397 | .0208 | .0498 | 38.45 | 11.02 | | |
| 8 | 2.8 | do | n-Butane | 0.397 | .0507 | .113 | 38.45 | 6.81 | | |
| 9 | 1.0 | do | Butene-1 | 0.397 | .0603 | .137 | 38.45 | 4.6 | 1.08 | 1.296 |
| 10 | 16.5 | do | Isobutane | 0.397 | .0136 | .0331 | 38.45 | 16.56 | | |
| 11 | 2.0 | do | Butadiene | 0.397 | .1805 | .313 | 38.3 | 2.04 | 2.43 | 2.92 |
| 12 | 2.5 | do | Butene-2 | 0.397 | .1932 | .327 | 38.3 | 2.42 | 2.54 | 2.46 |
| 13 | 20 | do | n-Butane | 0.397 | .0586 | .129 | 38.3 | 5.96 | | |
| 14 | 2.8 | do | Butene-2 | 0.397 | .1733 | .304 | 38.45 | 2.62 | 2.36 | 2.275 |
| 15 | 2.8 | do | n-Butane | 1.588 | .1492 | .0859 | 38.45 | 8.96 | | |
| 16 | 1.5 | do | Butene-1 | 0.397 | .0601 | .131 | 38.45 | 4.81 | 1.015 | 1.24 |
| 17 | | Furfural—4 weight per cent water. | b-Butane | 1.408 | .129 | .0839 | 38.47 | 9.17 | | |
| 18 | | do | Butene-1 | 1.408 | .153 | .0980 | 38.47 | 6.43 | 1.02 | 1.235 |

It will be observed from these data that the various lower aliphatic hydrocarbons and aliphatic chlorinated nitriles possess utility as selective solvents for the concentration of olefins. It also appears that acetonitrile and monochloroacetonitrile possess special advantages for such use, and that multi-component mixtures of different nitriles or nitriles and water display good selectivity. Further, it will be observed that certain of the solvents show a higher selectivity for the paraffin than for the olefin. The invention comprehends processes utilizing such solvents involving a reversal in the hydrocarbon concentrated in the liquid phase.

We claim:

1. The method of separating propene and propane which comprises extractively distilling the propene-propane mixture with a relatively less volatile multicomponent solvent which comprises, as a first component, acetonitrile, and, as a second component, a compound selected from the group consisting of acrylonitrile and monochloroacetonitrile, said first and second components being present in about equal volume proportions, removing a vapor fraction relatively rich in propane, removing a liquid fraction comprising propene and solvent.

2. The method of separating propene and propane which comprises extractively distilling the propene-propane mixture with a relatively less volatile multicomponent solvent which comprises about 47.5 to about 65% by volume of acetonitrile, about 50 to about 20% by volume of acrylonitrile and about 0 to about 15% by volume of water, removing a vapor fraction relatively rich in propane, removing a liquid fraction comprising propene and solvent.

JOHN W. TETER.
EDWIN W. SHAND.

REFERENCES CITED

The following references are of record in the file of this patent:

UNITED STATES PATENTS

| Number | Name | Date |
| --- | --- | --- |
| 2,379,696 | Evans | July 3, 1945 |